US008555137B2

(12) United States Patent
Brown (10) Patent No.: US 8,555,137 B2
(45) Date of Patent: *Oct. 8, 2013

(54) METHOD AND SYSTEM FOR REDUCING VOLATILE DRAM POWER BUDGET

(75) Inventor: Terry C. Brown, Austin, TX (US)

(73) Assignee: Frankfurt GmbH, LLC, Wilmington, DE (US)

( * ) Notice: Subject to any disclaimer, the term of this patent is extended or adjusted under 35 U.S.C. 154(b) by 1750 days.

This patent is subject to a terminal disclaimer.

(21) Appl. No.: 11/877,523

(22) Filed: Oct. 23, 2007

(65) Prior Publication Data

US 2008/0046798 A1    Feb. 21, 2008

Related U.S. Application Data

(62) Division of application No. 11/066,103, filed on Feb. 25, 2005, now Pat. No. 7,379,368.

(51) Int. Cl.
*H03M 13/00*   (2006.01)

(52) U.S. Cl.
USPC .......................................................... 714/758

(58) Field of Classification Search
USPC .......................................................... 714/758
See application file for complete search history.

(56) References Cited

U.S. PATENT DOCUMENTS

| 4,530,055 | A  | * | 7/1985  | Hamstra et al. ........... 711/136 |
| 6,216,246 | B1 | * | 4/2001  | Shau ........................... 714/763 |
| 6,510,394 | B2 |   | 1/2003  | Huang et al. |
| 6,728,138 | B2 |   | 4/2004  | Katayama et al. |
| 7,024,571 | B1 |   | 4/2006  | Reger et al. |
| 7,139,937 | B1 |   | 11/2006 | Kilbourne et al. |
| 7,225,375 | B2 | * | 5/2007  | Cochran et al. ........... 714/733 |
| 7,246,300 | B1 | * | 7/2007  | Au et al. ................... 714/758 |
| 7,296,128 | B2 |   | 11/2007 | Lee |
| 7,304,893 | B1 |   | 12/2007 | Hemink |
| 7,320,100 | B2 | * | 1/2008  | Dixon et al. ............... 714/758 |
| 8,024,638 | B2 | * | 9/2011  | Resnick et al. ............ 714/758 |
| 2004/0153902 | A1 | * | 8/2004 | Machado et al. ............ 714/710 |
| 2007/0091678 | A1 |   | 4/2007 | Kato et al. |
| 2009/0070612 | A1 | * | 3/2009 | Adelman et al. ........... 713/322 |

OTHER PUBLICATIONS

Office Action for U.S. Appl. No. 11/066,103 mailed Sep. 11, 2007.
Notice of Allowability for U.S. Appl. No. 11/066,103 mailed Jan. 28, 2008.
Notice of Allowability for U.S. Appl. No. 12/127,745 mailed Oct. 6, 2008.

* cited by examiner

*Primary Examiner* — Albert Decady
*Assistant Examiner* — Enam Ahmed
(74) *Attorney, Agent, or Firm* — Schwabe, Williamson & Wyatt, P.C.

(57) ABSTRACT

A portable device (114) includes a power source (120), a volatile memory (118) requiring refreshing to avoid data loss, and a memory management module (116). The volatile memory (118) is operably coupled to the power source (120) for power. The memory management module (116) is operably coupled to the volatile memory (118). The memory management module (116) is also adapted to refresh the volatile memory (118) at a refresh rate which causes refresh-based errors and to correct the refresh-based errors. Also disclosed is a method for reduced power consumption by a volatile memory requiring refreshing to avoid data loss in which such a volatile memory is refreshed (122) at a refresh rate. All defective bits are detected (124) at the refresh rate. An error correction code is selected (126) for correcting the defective bits.

22 Claims, 4 Drawing Sheets

METHOD AND SYSTEM FOR REDUCING VOLATILE DRAM POWER BUDGET

TECHNICAL FIELD OF THE DISCLOSURE

This disclosure pertains to the field of memory devices. In particular, this disclosure pertains to a method and system for reducing the power requirements of volatile DRAM.

BACKGROUND OF THE DISCLOSURE

Portable devices which incorporate memory components are becoming very popular. Non-volatile memory chips have typically been utilized in such portable devices because volatile DRAM chips typically require a much greater power budget while in standby mode than comparable non-volatile memory devices because volatile DRAM chips must be periodically refreshed to avoid data loss.

Present manufacturing methods produce a relatively large number of volatile DRAM chips containing at least some defective bits according to one or more failure modes. Such defective volatile DRAM chips are typically much less expensive than unflawed volatile DRAM chips.

Additionally, manufacturers typically set suggested refresh rate frequencies conservatively. The true frequency at which a particular volatile DRAM chip must be refreshed to avoid losing data varies according to many factors, including component variance and environmental factors, among others.

Therefore, a method and system for utilizing defective volatile DRAM and under refreshing volatile DRAM without loss of data in portable devices is desired.

BRIEF DESCRIPTION OF THE DRAWINGS

For a more complete understanding of the present disclosure, and the advantages thereof, reference is now made to the following brief descriptions taken in conjunction with the accompanying drawings, in which like reference numerals indicate like features.

DETAILED DESCRIPTION

This disclosure provides a method and system for reducing volatile DRAM power consumption. Various aspects, objectives, and advantages of the invention will become more apparent from the remainder of the detailed description when taken in conjunction with the accompanying drawings.

Volatile dynamic random access memory (volatile DRAM) is a type of volatile memory which must be periodically refreshed to avoid data loss. Volatile DRAM will be used throughout this disclosure as the primary example of volatile memory requiring periodic refreshing. Similarly, Reed-Solomon codes will be used throughout this disclosure as the primary example of error correction codes. Those skilled in the art will understand that the use of such examples, among others, to teach embodiments of the present invention does not serve to reduce the spirit or scope of the appended claims.

As will be explained below, detective volatile DRAM chips can exhibit one or more failure modes due to various manufacturing defects. Under-refreshed volatile DRAM chips can exhibit errors corresponding to the failure mode of randomly distributed errors.

Reed-Solomon codes are an effective class of error correction codes that can be utilized to correct errors from many failure modes. In particular, Reed-Solomon codes are highly effective in correcting errors corresponding to the failure mode of randomly distributed errors.

A process for automatically selecting a well-fitted code for each device constitutes part of a general-purpose method of correcting volatile DRAM errors. A preferred embodiment includes a portable device having hardware and software error correction logic.

Volatile DRAM manufacturing processes tend to produce a large number of defective chips. Many applications that use volatile DRAM, including personal computers, cannot make use of memory chips that have even a single defective bit. Other applications can gracefully handle memory errors with performance losses that are roughly proportional to the number of errors. An example of this type of application is non-MP3 digital audio. In a non-MP3 digital audio application, each memory location holds a sample of data used to produce an audio signal. Since audio is made up of large numbers of continuous samples the listener will not hear an occasional error. If the number of errors is large or arranged in certain patterns rather than random the listener will hear "noise" mixed in with the audio.

For MP3 audio the situation is much worse when errors occur. A single error in the MP3 data can cause an entire block of samples to be in error, resulting in a much larger loss of audio quality. For this reason MP3-memory is generally required to be defect-free. Similar to personal computer applications, the memory that holds the software for performing MP3 or other processing must also be defect-free to ensure proper operation. Most portable devices use this type of embedded software and therefore must have defect-free memory.

In order for defective volatile DRAM to be useful in applications that require error free data, the errors must be corrected or avoided. Avoiding errors implies a loss of memory capacity since a portion of the memory is simply unused. Correcting errors also results in a loss of capacity because additional information must be stored as overhead bytes in the memory to make the errors correctable. The method of correcting the errors will vary depending on the pattern of the errors. If a single error correction code is used to cover all cases it is likely to be very inefficient and result in too much capacity loss. Instead the present invention tailors the error correction code to the failure mode of the volatile DRAM chip.

Silicon defects caused by contaminants and other production issues are often localized on the die. As explained below in connection with FIG. 1, the resulting failure mode will depend on which portion of the memory is affected by the defect. In addition to the failure modes described in connection with FIG. 1, variations in the doping level of the silicon and other aspects of the manufacturing process can cause non-localized failures. Such failures generally result in chips that do not meet speed requirements over their specified operating ranges. However, such chips may be useable by applications that can operate at a lower frequency.

Reed-Solomon codes can be used to correct errors for many volatile DRAM failure modes resulting from silicon defects because such codes are highly effective in correcting random errors. Commonly used Reed-Solomon codes operate over the Galois field GF(256) because this field results in a basic unit of data that is eight bits (one byte) wide. A GF(256) based Reed-Solomon codeword can be a maximum size of 255 bytes, including both the original data and the additional overhead data needed to correct errors. In general two overhead bytes are needed to correct one erred original byte.

The erred data can be located at any byte within the codeword and can affect any number of bits within that byte. Reed-Solomon codes are usually specified in terms of the codeword size and the number of message bytes. For example, the code RS(240,208) has a codeword of size 240, a message word of size 208, and 240−208=32 bytes of overhead data and can correct 32÷2=16 bytes of data. If the exact failure mode of a particular defective volatile DRAM is known, a code can be chosen to correct it with the minimum amount of overhead. Some embodiments taught by the present disclosure will automatically determine the failure mode and then use the appropriate code. Alternately, a more general-purpose code can be used. As specified above, the present invention is not limited in using Reed-Solomon codes for error correction.

A much less computationally intensive code can be used effectively if all of the erred memory locations are known. For each erred byte, a first method, "Method A," simply stores an address indicating the erred data location and the corrected data for that location. When such codewords are limited to 255 bytes, the overhead required by Method A is the same as for Reed-Solomon codes: two bytes per corrected byte.

If the error location is consistent from one codeword to the next, a second method, "Method B," can be used to store the location only once, thereby reducing the overhead below the level that would have been required by Reed-Solomon and by Method A. This approach requires very little processing power but does require the error correction table to be stored in a defect free memory location. Reed-Solomon codes work even if errors occur in the overhead bytes as well as the message data. Therefore, Reed-Solomon does not require any portion of memory to be completely defect-free.

Failure modes of various memory chips are determined through testing. (1) A memory test is run which detects all failing locations. (2) The failure patterns are analyzed to determine the failure mode. There may be multiple failure modes in a single memory. (3) An error correction code is chosen to correct each failure mode and uncorrectable blocks are marked.

Figure 1:
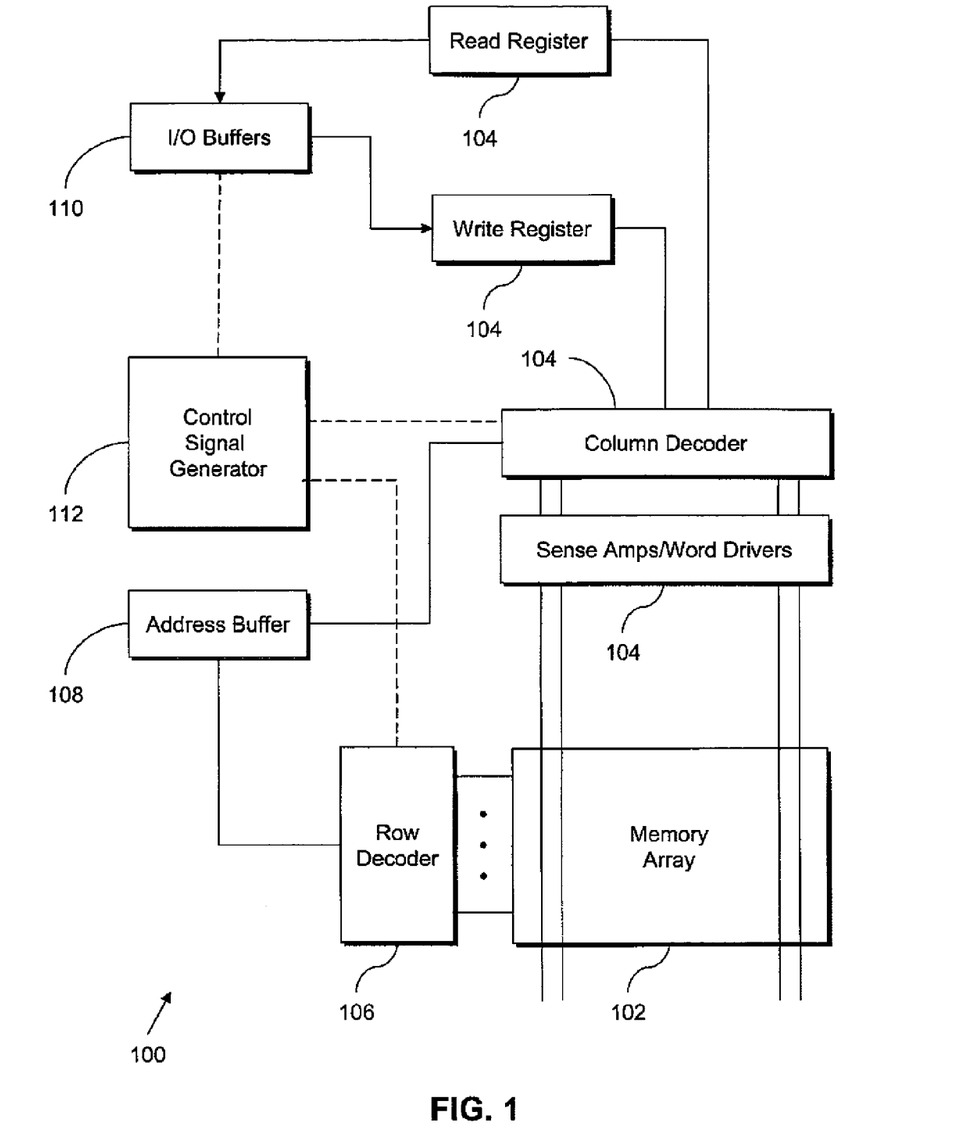
FIG. 1 schematically illustrates an SDRAM example of volatile DRAM to highlight typical error locations.

FIG. 1 schematically illustrates an SDRAM 100 example of volatile DRAM to highlight typical error locations. Each type of error is associated with one or more failure modes and correction approaches:

Bit array random errors 102 occur due to localized defects. These types of errors lend themselves well to error correction. Depending on the number and distribution of errors, Reed-Solomon codes or another method of error correction may be used. If a memory block contains too many defects to be corrected by the common code, it is marked as uncorrectable.

Row bit errors 104 affect the same bit, or bits, within a row (across one or more columns) due to decoding errors, sense-amp failures, or bad bit lines. The resulting regular pattern or structure makes error locations known, so they can be corrected by storing correction data in another location. Method A, B, or Reed-Solomon algorithms may be used to correct these errors.

Row select errors 106 affect a range of contiguous addresses due to decoding or word line failures. Decoding failures may cause multiple addresses to map to the same memory and some rows may not be accessible. Errors of this type are best handled by avoiding the failing address range.

Not shown in FIG. 1 are bank select errors, for which the same strategy of address avoidance would apply.

Addressing errors 108 can affect both rows and columns, and require multiple correction and avoidance algorithms. Column addressing errors can cause multiple memory blocks to be un-useable and can therefore be marked as uncorrectable. This applies to defects in the high order bits of the row address as well. Low order row addressing defects will result in defects in a consistent location within each block. These can be corrected by Method A or B or by using an optimal RS code.

I/O Buffer errors 110 affect the same bit, or bits, within every interface word. This type of error makes the effective use of RAM difficult to achieve, as the error may affect row addresses, column addresses, and data.

Control logic defects 112 will normally prevent the memory chip from being useable in any fashion.

Figure 2:
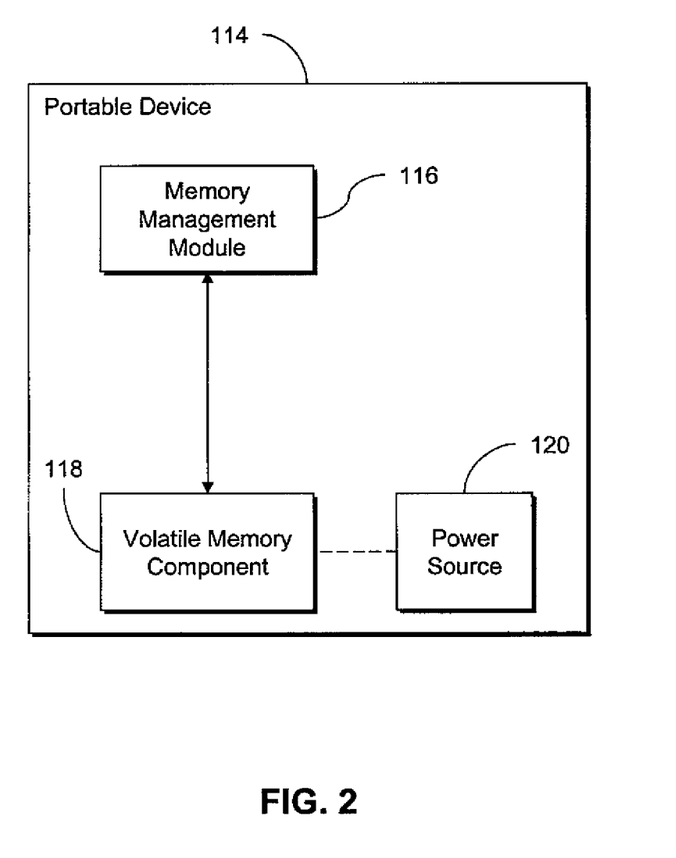
FIG. 2 schematically shows a portable device having a memory management module, a volatile DRAM chip, and a power source.

FIG. 2 schematically shows a portable device 114 having a memory management module 116, a volatile DRAM chip 118, and a power source 120. The volatile DRAM component 118 is shown to be operably coupled to the power source 120 for power. The memory management module 116 is depicted as being operably coupled to the volatile DRAM component 118. The memory management module 116 is adapted to refresh the volatile DRAM chip 118 at a refresh rate which causes refresh-based errors and to correct the refresh-based errors. The refresh and correction functions are described as being performed by a single memory management module 116; alternately, the functions can be performed by separate modules.

In the preferred embodiment, the volatile DRAM chip 118 is DRAM, and the power source 120 is a battery. The memory management module 116 can use Reed-Solomon code to correct the refresh-based errors. The memory management module 116 can refresh the volatile DRAM 118 while the portable device 114 is in a standby mode and can correct the refresh-based errors after the portable device 114 leaves the standby mode. Alternately, the memory management module 116 can correct the refresh-based errors after the portable device 114 enters an active mode and, possibly, presents an indication that access of a selected portion of memory is imminent.

Figure 3:
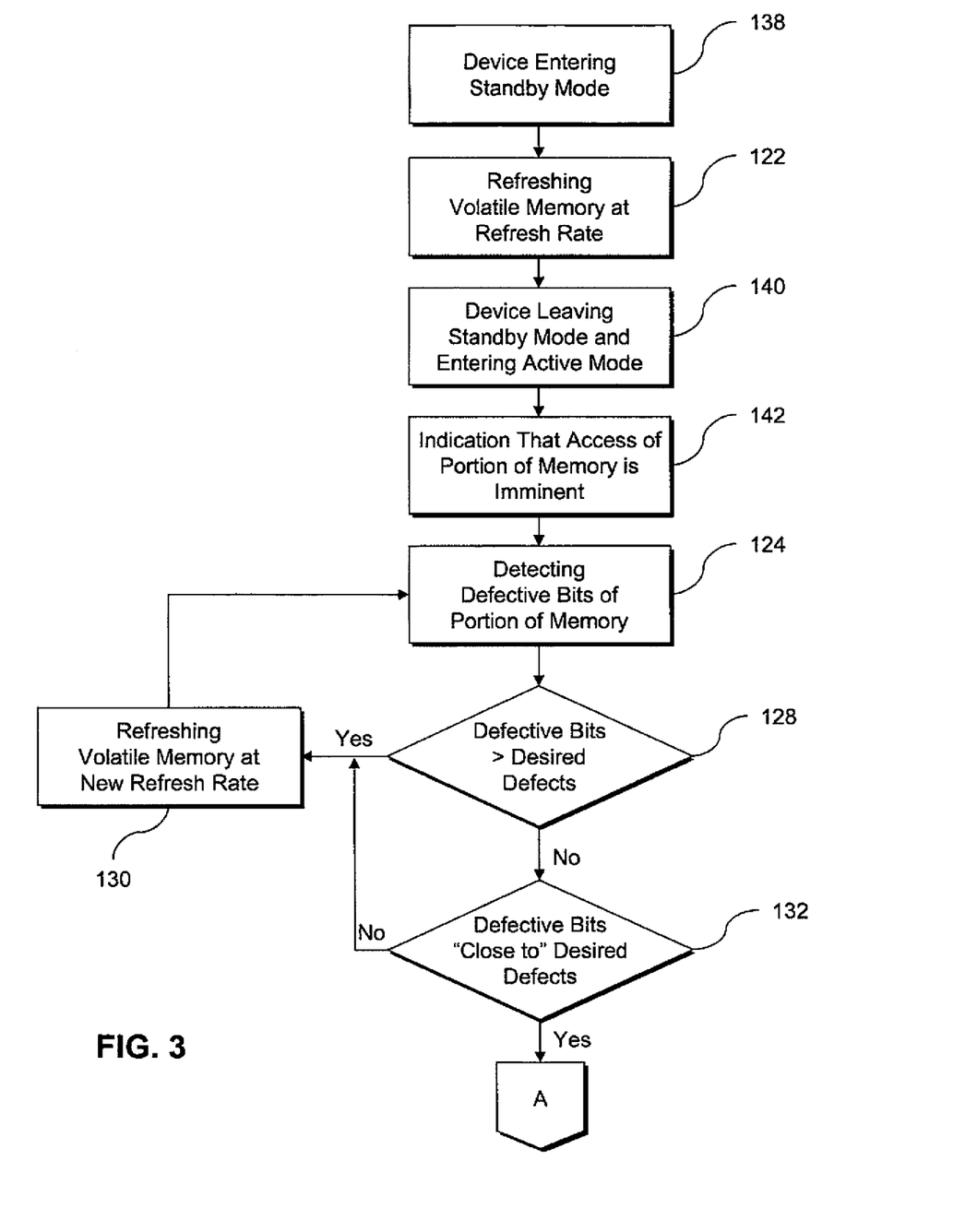
FIGS. 3 and 4 illustrate a method for reduced power consumption by a volatile DRAM chip.
Figure 4:
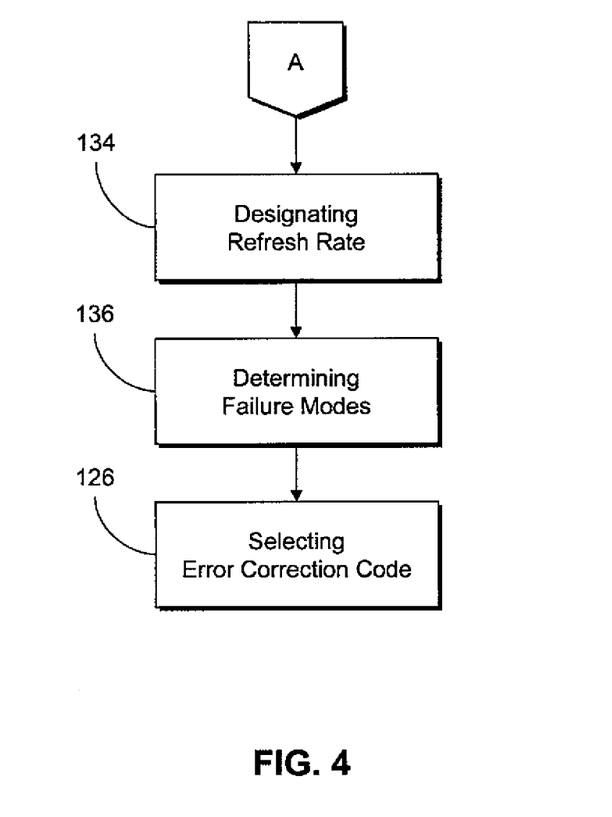

FIGS. 3 and 4 illustrate a method for reduced power consumption by a volatile DRAM chip. A volatile DRAM is refreshed 122 at a refresh rate. All defective bits at the refresh rate are detected 124. An error correction code is selected 126 for correcting the defective bits. Preferably, all subsequent low power modes of the DRAM use the determined refresh rate and error correction is performed based on the selected error correction code.

Alternately, the number of defective bits at the refresh rate is compared 128 to a desired number of defective bits. If the number of defective bits is greater than the desired number of defective bits, the steps of refreshing, detecting, and determining are repeated with another refresh rate 130 having a higher frequency. If the desired number of defective bits is higher than the number of defective bits by fewer than a selected number of bits 132, designating 134 the refresh rate corresponding to the number of defective bits as an optimal refresh rate.

Also alternately, all failure modes corresponding to the defective bits at the refresh rate are determined 136. In such case, the error correction code can be selected for correcting the defective bits based on the failure modes.

In a preferred embodiment, the volatile DRAM will be refreshed at a different refresh rate when the device is in standby mode 138 than when the device is in active mode. In such a case, all defective bits are typically detected at the refresh rate after the device has left the standby mode. In particular, all defective bits are detected at the refresh rate after the device has left the standby mode and after the device has entered an active mode 140. Alternately, all defective bits at the refresh rate associated with a portion of the volatile DRAM are detected after the device has left the standby mode, entered an active mode, and indicated that access of the portion of memory is imminent 142.

The ability to correct memory defects allows the refresh rate of a volatile DRAM, such as DRAM, to be reduced to the point that errors occur. As a practical matter, some cells are more sensitive to slower refresh rates than others due to variations among individual memory cells.

The failing bits will typically appear as random errors and can be effectively corrected using a Reed-Solomon code. If a memory is under refreshed at a constant refresh rate for an extended period of time, the same weaker bit cells would be expected to fail consistently; as a result, the number of bit failures would not be expected to change significantly during the time period. Therefore, the preferred method of the present disclosure includes determination of a selected refresh rate during search mode. Once a selected refresh rate has been determined, it is preferably utilized without revision during subsequent normal operation. This property allows under refreshing at the selected refresh rate to be used to reduce the power budget of a volatile DRAM chip for an extended time period.

As a practical matter, under refreshing of volatile DRAM could be employed concurrently with the remainder of the device being in a low power or "standby" mode. When the device returns to normal operation, the data could then be corrected and written back into the volatile DRAM. Only a single error correction cycle would be needed following a time period of under refreshing, even if the time period were lengthy. Thus, only a single error correction cycle would be needed for each standby-active cycle of the device.

As part of the initialization process upon transitioning from standby mode to active mode, data correction could be performed for the entire memory or, alternately, for a portion of the memory as that portion is accessed. For example, error correction could be performed for a particular memory block upon indication that the block will be accessed imminently.

In order for the under-refresh method to be effective at saving power, the power saved by under refreshing must exceed the power used in error correction. Often this will be the case because error correction occurs once per block while under refreshing can apply during the entirety of an extended time in standby mode. An example of this occurs when DRAM is used as non-volatile storage.

A general purpose Reed-Solomon code can be used to correct under-refresh errors because such errors tend to appear at unpredictable locations. The error correction capability of the Reed-Solomon code depends on the number of overhead bytes added to the original data. The power of a Reed-Solomon code is proportional to the number of overhead bytes utilized.

A more powerful Reed-Solomon code allows for a greater reduction in refresh rate and greater resultant power savings while under refreshing. However, using a large number of overhead bytes consumes more memory capacity, reduces the remaining capacity of memory available to store user information, increases the number of cycles required to correct the errors, and increases the power required for error correction.

The code selected for each implementation will be based on the usage model for the device and the characteristics of the volatile DRAM under consideration. In many embodiments, the refresh rate and corresponding error correction code will be chosen such that few errors require correction. If this is the case, the chosen refresh rate will be unlikely to produce errors that cannot be corrected by the error correction code while still providing significant power savings.

An optimal code for correcting manufacturing defects can be empirically determined as described above. Similarly, an optimal code and optimal refresh rate for a particular device can be chosen by applying a similar algorithm at various refresh rates. As briefly touched on above, the preferred approach is to utilize a selected refresh rate somewhat lower than the tested optimal refresh rate. This establishes a "margin of safety" that allows for variation in environmental factors, such as temperature, voltage, and other factors, which could otherwise pose problems during normal operation.

Alternately, an error correction approach can involve multiple methods, each tailored to the failure mode of a specific volatile DRAM chip. More than a single level of error correction and avoidance can be used, and preferably, two levels are used.

In some devices, the volatile DRAM is treated as a file system and formatted as a partition, such as DOS FAT. Such a file system structure enables definition of blocks of data as unusable, so uncorrectable portions of memory can be avoided. A section of memory is typically considered uncorrectable if the overhead needed to correct it is "too large" to make effective use of the remaining usable memory. At the extreme, a memory block with 50% unusable bytes would be uncorrectable by definition because all of the usable bytes would be filled with error correction overhead bytes. In practice, memory blocks with much lower error counts will be considered uncorrectable. The exact value depends on the processing power available to correct the errors, among other factors.

For correctable file system blocks, a defect table can be maintained defining which memory blocks need correction and which are defect-free. The defect table requires only one bit per memory block. More than one bit may be used in alternate embodiments if increased error correction capability is desired. However, when multiple error correction codes are used, additional information is required for each erred memory block. Such additional information can exist in a separate table that contains information sufficient to describe the error correction code for that block. Alternately, the information can be incorporated into the defect table. For each defective block, a code of $\log_2 N$ bits is maintained, where N is the number of error correction codes in use.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing embodiments of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. For example, the volatile DRAM may be implemented in a particular embodiment as DDR-SDRAM or other volatile DRAM. In another example, the selected refresh rate may be set to be equal to the optimal refresh rate, thereby utilizing the optimal refresh rate without the aforementioned "margin of safety." In yet another example, an embodiment of the claimed invention comprises a non-portable device such as a remote data acquisition system. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, comprising:
    refreshing a volatile memory at a refresh rate to avoid loss of data, wherein the refreshing the volatile memory at the refresh rate includes refreshing the volatile memory at the refresh rate while a device operably coupled to the volatile memory is in a standby mode;
    detecting defective bits at the refresh rate; and
    selecting an error correction code to correct the detected defective bits,
    wherein selecting the error correction code is based at least in part on determining one or more failure modes associated with one or more patterns of failing locations corresponding to the detected defective bits at the refresh rate.

2. The method of claim 1, further comprising:
    comparing a number of detected defective bits detected at the refresh rate to a threshold of detected defective bits; and
    if the number of detected defective bits is greater than the threshold of detected defective bits, repeating said refreshing and detecting with another refresh rate having a higher frequency than an immediately preceding refresh rate that was employed.

3. The method of claim 2, further comprising:
    if the threshold of detected defective bits is higher than the number of detected defective bits by fewer than a selected number of bits, designating the refresh rate corresponding to the number of detected defective bits as an optimal refresh rate.

4. The method of claim 1, further comprising:
    determining all failure modes corresponding to the detected defective bits at the refresh rate.

5. The method of claim 4, wherein the selecting the error correction code to correct the detected defective bits includes:
    selecting, based on the determined failure modes, an error correction code to correct the detected defective bits.

6. The method of claim 1,
    wherein the detecting defective bits at the refresh rate includes:
    detecting all defective bits at the refresh rate after the device has left the standby mode.

7. The method of claim 6, wherein the detecting all defective bits at the refresh rate after the device has left the standby mode includes:
    detecting all defective bits at the refresh rate after the device has left the standby mode and after the device has entered an active mode.

8. The method of claim 7, wherein the detecting all defective bits at the refresh rate after the device has left the standby mode and after the device has entered an active mode includes:
    detecting all defective bits at the refresh rate associated with a portion of the volatile memory after the device has left the standby mode, entered an active mode, and indicated that a portion of volatile memory having detected defective bits will be accessed.

9. A system, comprising:
    a power source;
    a volatile memory configured to be refreshed to avoid loss of data, the volatile memory operably coupled to the power source;
    a memory management module operably coupled to the volatile memory and configured to refresh the volatile memory at a refresh rate, detect defective bits of the volatile memory in response to said refresh, and select an error correction code to correct the detected defective bits,
    wherein the memory management module is further configured to refresh at the refresh rate while a device coupled to the volatile memory is in a standby mode, and
    wherein the memory management module is further configured to determine one or more failure modes associated with one or more patterns of failing locations corresponding to the detected defective bits at the refresh rate and to select the error correction code based at least in part on the determined failure modes.

10. The system of claim 9 wherein the memory management module is further configured to:
    compare a number of detected defective bits at the refresh rate to a threshold of defective bits, and
    if the number of detected defective bits is greater than the threshold number of defective bits, cause the volatile memory to be refreshed at another refresh rate having a higher frequency than an immediately preceding refresh rate that was employed.

11. The system of claim 9 wherein the memory management module is further configured to:
    compare a number of detected defective bits at the refresh rate to a threshold number of defective bits, and
    if the number of detected defective bits is equal to or less than the threshold number of detected defective bits, designate the refresh rate as an optimal refresh rate.

12. The system of claim 9 wherein the memory management module is further configured to detect the defective bits after the device has left the standby mode.

13. An apparatus, comprising:
    first means for storing data; and
    second means for refreshing the first means for storing data at a refresh rate to avoid loss of said stored data, for detecting defective bits at the refresh rate, and for selecting an error correction code for correcting the detected defective bits based at least in part on determining one or more failure modes associated with one or more patterns of failing locations corresponding to the detected defective bits at the refresh rate, wherein for refreshing at the refresh rate, the second means includes means for refreshing at the refresh rate the first means while a device operably coupled to the first means is in a standby mode.

14. The apparatus of claim 13 wherein the second means includes:
 means for determining whether a number of detected defective bits at the refresh rate exceeds a threshold number of defective bits; and
 means for selecting another refresh rate having a higher frequency than an immediately preceding refresh rate that was employed in response to a determination that the number of detected defective bits exceeds the threshold number of defective bits.

15. The apparatus of claim 13 wherein the second means includes:
 means for determining all failure modes corresponding to the detected defective bits at the refresh rate.

16. The apparatus of claim 15, wherein the second means includes means for selecting, based on the determined failure modes, the error correction code for correcting the detected defective bits.

17. The apparatus of claim 13, wherein:
 for detecting defective bits at the refresh rate, the second means includes means for detecting all defective bits at the refresh rate after the device has left the standby mode.

18. The apparatus of claim 17, wherein the means for detecting all of the defective bits at the refresh rate after the device has left the standby mode include means for detecting all of the defective bits at the refresh rate after the device has left the standby mode and after the device has entered an active mode.

19. The apparatus of claim 18, wherein the means for detecting all of the defective bits at the refresh rate after the device has left the standby mode and after the device has entered an active mode includes means for detecting all of the defective bits at the refresh rate associated with a portion of the first means having detected defective bits after the device has left the standby mode, entered an active mode, and indicated that the portion of the first means having detected defective bits will be accessed.

20. An apparatus, comprising:
 a memory configured to be refreshed to avoid loss of data; and
 a memory management module operably coupled to the memory and configured to refresh the memory at a refresh rate while a device operably coupled to the memory is in a standby mode, detect defective bits of the memory in response to said refresh, and select an error correction code to correct the detected defective bits,
 wherein the memory management module is further configured to detect the defective bits after the device coupled to the memory has left the standby mode,
 wherein the memory management module is further configured to determine one or more failure modes associated with one or more patterns of failing locations corresponding to the detected defective bits at the refresh rate and to select the error correction code based at least in part on the determined failure modes.

21. The apparatus of claim 20 wherein the memory management module is further configured to refresh at the refresh rate while the device is in the standby mode.

22. The apparatus of claim 20 wherein the memory includes dynamic random access memory (DRAM).

* * * * *

UNITED STATES PATENT AND TRADEMARK OFFICE
CERTIFICATE OF CORRECTION

| | |
|---|---|
| PATENT NO. | : 8,555,137 B2 |
| APPLICATION NO. | : 11/877523 |
| DATED | : October 8, 2013 |
| INVENTOR(S) | : Brown |

It is certified that error appears in the above-identified patent and that said Letters Patent is hereby corrected as shown below:

In the Specification

In Column 1, Line 66, delete "detective" and insert -- defective --, therefor.

In Column 3, Line 49, delete "approaches:" and insert -- approaches. --, therefor.

Signed and Sealed this
Twenty-fifth Day of March, 2014

Michelle K. Lee
*Deputy Director of the United States Patent and Trademark Office*